(12) United States Patent
Desai et al.

(10) Patent No.: US 7,873,608 B2
(45) Date of Patent: Jan. 18, 2011

(54) PATTERN MATCHING ALGORITHM TO DETERMINE VALID SYSLOG MESSAGES

(75) Inventors: Neeshant Desai, Auburn, CA (US); Adrian Cowham, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1459 days.

(21) Appl. No.: 11/138,530

(22) Filed: May 25, 2005

(65) Prior Publication Data
US 2006/0288003 A1    Dec. 21, 2006

(51) Int. Cl.
*G06F 7/00* (2006.01)
*G06F 15/177* (2006.01)
*G06N 5/00* (2006.01)

(52) U.S. Cl. .......................... 707/694; 706/45; 709/220
(58) Field of Classification Search ........................ None
See application file for complete search history.

(56) References Cited

U.S. PATENT DOCUMENTS

| | | | | |
|---|---|---|---|---|
| 6,493,713 | B1 * | 12/2002 | Kanno | 1/1 |
| 2003/0126501 | A1 * | 7/2003 | Musman | 714/26 |
| 2003/0135653 | A1 * | 7/2003 | Marovich | 709/250 |
| 2005/0038854 | A1 * | 2/2005 | Truty | 709/206 |
| 2005/0166099 | A1 * | 7/2005 | Shyu | 714/47 |
| 2006/0015597 | A1 * | 1/2006 | Scott et al. | 709/223 |
| 2006/0053477 | A1 * | 3/2006 | Grabarnik et al. | 726/1 |
| 2006/0101511 | A1 * | 5/2006 | Faillenot et al. | 726/13 |
| 2006/0112175 | A1 * | 5/2006 | Sellers et al. | 709/223 |
| 2006/0242123 | A1 * | 10/2006 | Williams, Jr. | 707/3 |

OTHER PUBLICATIONS

RFC3164—The BSD syslog Protocol, p. 1, author C.Lonvick Aug. 2001.*
Lonvick, Chris, "RFC 3164—The BSD SYSLOG Protocol," http://www.faqs.org/rfcs/rfc3164.html, The Internet Society 2001, pp. 1-23.

* cited by examiner

*Primary Examiner*—Neveen Abel Jalil
*Assistant Examiner*—Tarek Chbouki

(57) ABSTRACT

A method for validating a syslog message having a plurality of message components. The method includes providing a meta regular expression. The meta regular expression is formed from a set of regular expressions with each of the regular expressions corresponding to one of the plurality of message components. The meta-regular expression represents a plurality of message component patterns, each of the message component patterns representing a different ordering of individual regular expressions of the set of regular expressions. The method further includes comparing the syslog message with the meta regular expression. The syslog message is deemed valid if the syslog message matches one of the plurality of message component patterns represented by the meta regular expression.

18 Claims, 4 Drawing Sheets

```
   200  206 208 210 212         222 224
    {    {        {              {   {
<\d{2}>\sFeb\s\d{2}\s\d{2}:\d{2}:\d{2}\s\S{0,15}\s\s.{1 3}:.*
  }  }           }       }      }          }       }    }
 202 204        214     216    218        220     226  228 230

| | |
|---|---|
| 302 Priority | <\d{1,3}>\|\d{1,3} |
| 304 Timestamp | Jan\|Feb\|Mar\|Apr\|May\|Jun\|Jul\|Aug\|Sep\|Oct\|Nov\|Dec\s\d{d}\|\s\s\d{1}\s\d{2}:\d{2}:\d{2} |
| 306 Hostname | \s\S{0,15} |
| 308 Tag | {0,31}(:\|[\|\s |
| 310 Content | .* |

FIG. 3

PATTERN MATCHING ALGORITHM TO DETERMINE VALID SYSLOG MESSAGES

RELATED APPLICATIONS

The invention is related to a commonly-assigned patent application Ser. No. 11/137,885 entitled "SYSLOG MESSAGE HANDLING", by the same inventors herein, filed herewith and incorporated by reference herein.

BACKGROUND OF THE INVENTION

A system may include of one or more computers (including a syslog server) connected to a plurality of devices (e.g., printers, scanners, modems, etc.). As the devices communicate among themselves, the syslog server continuously receives incoming syslog messages. As discussed herein, syslog messages (such as those defined in "Request for Comments (RFC) 3164: The BSD Syslog Protocol") are small textual messages sent by a plurality of devices. The small textual messages may relay a variety of information (e.g., log data) to a central repository such as a syslog server.

Prior to being accepted and processed by a syslog server, each incoming syslog message is checked for validity. Syslog messages are checked for validity because, for example, a malformed syslog message can be detrimental to the system, such as compromising system security. Parsing is a method currently employed to validate syslog messages.

To facilitate discussion, FIG. 1 shows an example of an incoming syslog message. Generally speaking, a syslog message includes three constituent message components: a priority field 102, a header field 104 and a message field 106. Priority field 102 (e.g., <12>) provides a value indicating the urgency of the syslog message. Header field 104 includes two fields: a timestamp field 108 and a hostname field 110. Timestamp field 108 includes a date field 112 and a time field 114. Date field 112 (e.g., Feb 11) provides the month and day that the syslog message is created. Time field 114 (e.g., 22:14:15) provides the hours, minutes, and seconds that the syslog message is created.

Hostname field 110 (e.g., 127.0.0.1) provides the location address of the source device. Message field 106 includes a tag field 116 and a content field 118. Tag field 116 (e.g., HP012x911) provides the information about the process or program that sent the syslog message. Content field 118 (e.g., failed logon) provides the actual syslog message. The various fields mentioned above are described in detail in the "RFC 3164: The BSD Syslog Protocol" (RFC 3164). Since RFC 3164 is well known to those skilled in the art, the standards will not be discussed in details herein.

In the prior art, the incoming syslog messages are checked using a parsing algorithm. As discussed herein, parsing refers to the process of splitting up a continuous stream of characters into its constituent parts. FIG. 2 shows an example of a sequential parsing algorithm that may be employed to check a syslog message. FIG. 2 is discussed in relation to prior art FIG. 1. Note that if any part of the syslog message is considered invalid, then the syslog server may stop sequential parsing process and discard the syslog message that is currently being verified.

To check priority field 102, fields 200, 202, and 204 in the sequential parsing algorithm are compared against priority field 102. According to the sequential parsing algorithm, field 200 should be a left bracket, field 202 should contain 2 digits, and field 204 should be a right bracket. If the format and content for priority field 102 match these three fields, then priority field 102 is considered to be valid, and the syslog server checks the next field, header field 104.

Date field 112 is the first field checked in header field 104. Fields 206, 208, 210, and 212 in the sequential parsing algorithm are compared against date field 112. First, the syslog server checks for a space (field 206) between priority field 102 and date field 112. According to the sequential parsing algorithm, field 208 should contain the word "Feb," field 210 should be a space, and field 212 should contain 2 digits. If the format and content for date field 112 match these fields, then date field 112 is considered to be valid, and the syslog server proceeds to check the next part of header field 104.

Once date field 112 is checked, the syslog server checks time field 114. Fields 214, 216, 218, and 220 are compared against time field 114. First, the syslog server checks for a space (field 214) between date field 112 and time field 114. According to the sequential parsing algorithm, fields 216 (e.g., hour), 218 (minutes) and 220 (seconds) should each contain 2 digits followed by a colon. If the format and content for time field 114 match these fields, then time field 114 is considered to be valid, and the syslog server proceeds to check the next part of header field 104, hostname field 110.

Fields 222 and 224 are compared against hostname field 110. First, the syslog server checks for a space (field 222) between time field 114 and hostname field 110. According to the sequential parsing algorithm, field 224 should be a non-white space value from zero to 15 characters. If the format and content for hostname 110 match these fields, then hostname field 110 is considered to be valid, and the syslog server proceeds to check message field 106.

Tag field 116 is the first field checked in message field 106. First, the system checks for a space (field 226) between hostname field 108 and tag field 116. According to the sequential parsing algorithm, field 228 should be a value from 0 to 31 characters, and field 234 should be a colon. If the format and content for tag field 116 match these fields, then tag field 116 is considered to be valid, and the syslog server proceeds to check the final field, content field 118.

Field 230 in the sequential parsing algorithm is compared against content field 118. According to the sequential parsing algorithm, field 230 should be any character repeating. If the format and content for content field 118 match field 230, then content field 118 is considered to be valid, and the syslog server accepts the incoming syslog message as valid.

There are several disadvantages to using parsing algorithm (i.e., sequential parsing algorithm). One, parsing algorithm usually requires a syslog server to traverse through each field in the syslog message. Consequently, validating an incoming syslog message may take a while, especially if the syslog message is long. Second, the parsing algorithm can become long, complicated, and difficult to maintain (especially if the original programmer is no longer available to consult on changes). Hence, changes in the RFC 3164 standards or in the programming language can result in extensive code changes. Third, the parsing algorithm may be written in a programming language that is specific to a platform and may not be easily portable to another platform without incurring significant cost to rewrite the codes.

SUMMARY OF INVENTION

The invention relates, in an embodiment, to a method for validating a syslog message having a plurality of message components. The method includes providing a meta regular expression. The meta regular expression is formed from a set of regular expressions with each of the regular expressions corresponding to one of the plurality of message components.

The meta-regular expression represents a plurality of message component patterns, each of the message component patterns representing a different ordering of individual regular expressions of the set of regular expressions. The method further includes comparing the syslog message with the meta regular expression. The syslog message is deemed valid if the syslog message matches one of the plurality of message component patterns represented by the meta regular expression.

In another embodiment, the invention relates to an article of manufacture comprising a program storage medium having computer readable code embodied therein. The computer readable code is configured to validate a syslog message having a plurality of message components. The article of manufacture further includes computer readable code for retrieving a meta regular expression from memory. The meta regular expression is formed from a set of regular expressions with each of the regular expressions corresponding to one of the plurality of message components. The meta-regular expression represents a plurality of message component patterns, each of the message component patterns representing a different ordering of individual regular expressions of the set of regular expressions. The article of manufacture also includes computer readable code for comparing the syslog message with the meta regular expression. The syslog message is deemed valid if the syslog message matches one of the plurality of message component patterns represented by the meta regular expression.

In yet another embodiment, the invention relates to an arrangement for a first syslog message having a plurality of message components. The arrangement includes a plurality of network components coupled to a network. The arrangement further includes a syslog server configured to receive syslog messages from the plurality of network components, including the first syslog message. The syslog server includes means for retrieving a meta regular expression. The meta regular expression is formed from a set of regular expressions with each of the regular expressions corresponding to one of the plurality of message components. The meta-regular expression represents a plurality of message component patterns, each of the message component patterns representing a different ordering of individual regular expressions of the set of regular expressions. The syslog server further includes means for comparing the syslog message with the meta regular expression. The syslog message is deemed valid if the syslog message matches one of the plurality of message component patterns represented by the meta regular expression.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 shows an example of a sequential parsing algorithm that may be used to check a syslog message.

FIG. 3 shows, in an embodiment, an example of a regular expression.

DETAILED DESCRIPTION OF EMBODIMENTS

Figure 1:
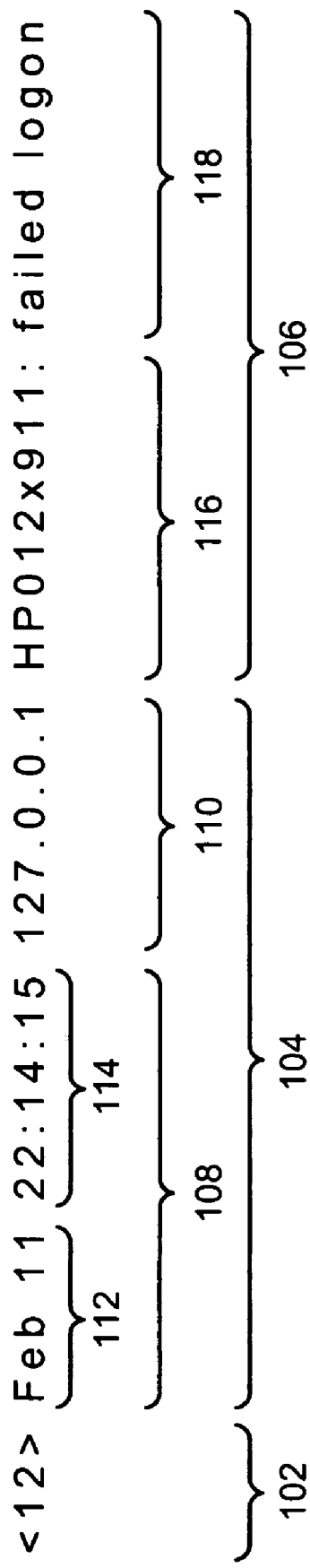
FIG. 1 shows an example of an incoming syslog message.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, there is provided a method for validating syslog messages having a plurality of message components using meta regular expression in a pattern-matching algorithm. As discussed herein, message components refer to the various constituent parts (i.e., priority field, header field, message field, etc.) of a syslog message. Also as discussed herein, meta regular expression is a string that includes all the possible combinations of regular expressions that may be found in a standard regular expression library and that may cover all valid syslog messages for a particular system.

Standards for a syslog message are currently defined in the "RFC 3164: The BSD Syslog Protocol" (RFC 3164). For example, the standards for the various different types of message components that may be part of a syslog message are defined in the RFC 3164. Common syntaxes that are defined in a standard regular expression library may be used to create regular expressions to represent the various message components. As discussed herein, a regular expression refers to a formula that describes a set of strings without having to actually list the elements.

Once regular expressions have been generated for each of the constituent message components of a syslog message, then these regular expresssions may be combined to form a plurality of valid message component patterns. As discussed herein, message component patterns refer to the various different ordering of individual regular expression. Using these valid message component patterns, a meta regular expression may be generated.

Instead of implementing a parsing algorithm, which usually requires multi-line codes that may be long and complex, an embodiment of the invention may employ a comparison mechanism such as a pattern-matching algorithm. Using a pattern-matching algorithm, the syslog server may compare an incoming syslog message with a meta regular expression to determine the validity of the incoming syslog message.

In an example, an incoming syslog message is received by a syslog server and is compared against a meta regular expression. If the incoming syslog message matches one of a plurality of message component patterns that may be found in the meta regular expression, the incoming syslog message is considered valid.

The features and advantages of the invention may be better understood with reference to the figures and discussions that follow. Currently, a standard regular expression library exists that defines the common syntaxes that may be used to form regular expressions. Table 1 illustrates some of the syntaxes that may appear in a regular expression.

TABLE 1

Common Syntaxes of Regular Expressions

| Syntaxes | Definition |
|---|---|
| <, >, Feb, 1 | examples of alpha numeric characters |
| \d | any digit |
| \s | space |
| . | any character |
| * | repeating character |
| .* | any character repeating |
| \S | non-whitespace character |
| x{m,n} | x at least m times, but no more than n times (in the range) |
| ( ) | grouping |
| \| | or |
| x{n} | x exactly n times |

FIG. 3 shows, in an embodiment, how the syntaxes in Table 1 may be used to create regular expressions. As mentioned before, regular expressions may be generated if the formats of a syslog message are known. The subcomponent (i.e. regular expression) examples shown in FIG. 3 are based on the current standards as defined in the RFC 3164.

Subcomponent 302 represents an example of a regular expression for the priority field using the syntaxes in Table 1. This regular expression defines a priority field as either having one to three digits within left and right angle brackets or one to three digits without angle brackets.

Subcomponent 304 represents an example of a regular expression for a timestamp field. As mentioned before, the timestamp field is part of a header field. According to this regular expression, the timestamp field first must be one of the twelve valid months. The month is separated from the day by a space. The day may be either two digits or a space and one digit. The day is separated from the time by a space. The time represents the hour, minute, and second and is shown as three sets of two digits separated by a colon.

Subcomponent 306 represents an example of a regular expression for a hostname field. Hostname field is also part of a header field. According to this regular expression, a hostname field is separated from a timestamp field by a space. The hostname field is a non-white space value that may be zero to 15 characters long. Since the hostname field may be an IP address, a DNS name, or a variation of other, actual content may not be checked.

Subcomponent 308 represents an example of a regular expression for a tag field. As mentioned before, a tag field is part of a message field. According to this regular expression, a tag field is separated from a hostname field by a space. The tag field is any value from zero to 31 characters long. The tag field is followed either by a colon, a bracket, or a space.

Subcomponent 310 represents an example of a regular expression for a content field. The content field is also part of a message field. According to this regular expression, a content field may be any character repeating.

These regular expressions may be joined to form a plurality of message component patterns. As mentioned before, each message component pattern refers to a different ordering of individual regular expressions. For example, a message component pattern that may be generated based on the subcomponents mentioned above may have the following pattern: subcomponents 302, 304, 306, 308, and 310 (see string below for an example of a message component pattern).

(<\d{1,3}>|\d{1,3})
(Jan|Feb|Mar|Apr|May|Jun|Jul|Aug|Sep|Oct|Nov|Dec)
(\s\d{2}|\s\s\d{1})\s\d{2}:\d{2}:\d{2}\s\S{0,15}\s.{0,31}(:|[|\s).*

Table 2 below provides some additional examples of message component patterns. Using message component patterns, embodiment of the invention allows for a plurality of message component patterns to be combined to form a meta regular expression. Depending upon the combination of all the possible message component patterns, a meta regular expression may become fairly extensive.

TABLE 2

Message Component Patterns

| Position 1 | Position 2 | Position 3 | Position 4 | Position 5 |
|---|---|---|---|---|
| 502 | 504 | 506 | 508 | 510 |
| 502 | 506 | 504 | 508 | 510 |
| 502 | 508 | 504 | 506 | 510 |
| 502 | 510 | 504 | 506 | 508 |
| 502 | 506 | 508 | 504 | 510 |
| 502 | 508 | 510 | 504 | 506 |
| 502 | 506 | 508 | 510 | 504 |
| 502 | 508 | 510 | 506 | 504 |
| 502 | 510 | 508 | 506 | 504 |

By comparing incoming syslog messages against a meta regular expression, the system is able to determine whether or not incoming syslog messages are valid. For example, if an incoming syslog message matches one of the message component patterns in the meta regular expression, the syslog message is considered valid. Instead of doing programmatic parsing, a programmer is now generating a meta regular expression that allows for a one-to-one comparison to occur when an incoming syslog message is received. The programming language used to code the meta regular expression may be a cross platform language such as Java or Pearl.

For example, a device sends a syslog message (e.g., <12>Mar 12 22:22:02 128.0.0.1 HP012X2: this is a test) to a syslog server. When the syslog message is received, the complete syslog message is compared against a meta regular expression (e.g., (((<\d{1,3}>|\d{1,3}) (Jan|Feb|Mar|Apr|May|Jun|Jul|Aug|Sep|Oct|Nov|Dec) (\s\d{2}|\s\s\d{1})\s\d{2}:\d{2}:\d{2}\s\S{0,15}\s.{0,31} (:|[|\s).*)((<\d{1,3}>|\d{1,3})\s\S{0,15} (Jan|Feb|Mar|Apr|May|Jun|Jul|Aug|Sep|Oct|Nov|Dec) (\s\d{2}|\s\s\d{1})\s\d{2}:\d{2}:\d{2}\s.{0,31}(:|[|\s).*))). In this example, the meta regular expression is a combination of two message component patterns. In an actual implementation, the number of message component patterns combined in a meta regular expression may vary as required to cover all possible orderings of syslog message subcomponents. A one-to-one comparison is performed and the incoming syslog message matches one of the various message component patterns shown in the meta regular expression; thus, the syslog message is considered valid and the message is processed.

In another example, assume that the syslog server receives a malformed syslog message (e.g., <12>Mar 012 22:22:02 128.0.0.1 HP012X2: this is a bad message). The syslog message is compared against a meta regular expression (such as the one in the above example). The syslog message has a message component (e.g., date field 012) that does not match any of a plurality of message components that may be found in the meta regular expression and is considered invalid by the syslog server. As a result, the malformed syslog message is discarded and error handling may occur.

Changes to either the standard regular expression library or to the standards for a syslog message may be accommodated using regular expressions. For example, the syntax \S may at some point be considered an invalid syntax in the standard regular expression library. Instead, \S is replaced by \W. To accommodate this change, a programmer replaces \S with \W in all the regular expressions. In the prior art, a programmer might have to review the parsing algorithm and make sure that the changes are accounted for in all the codes.

Figure 4:
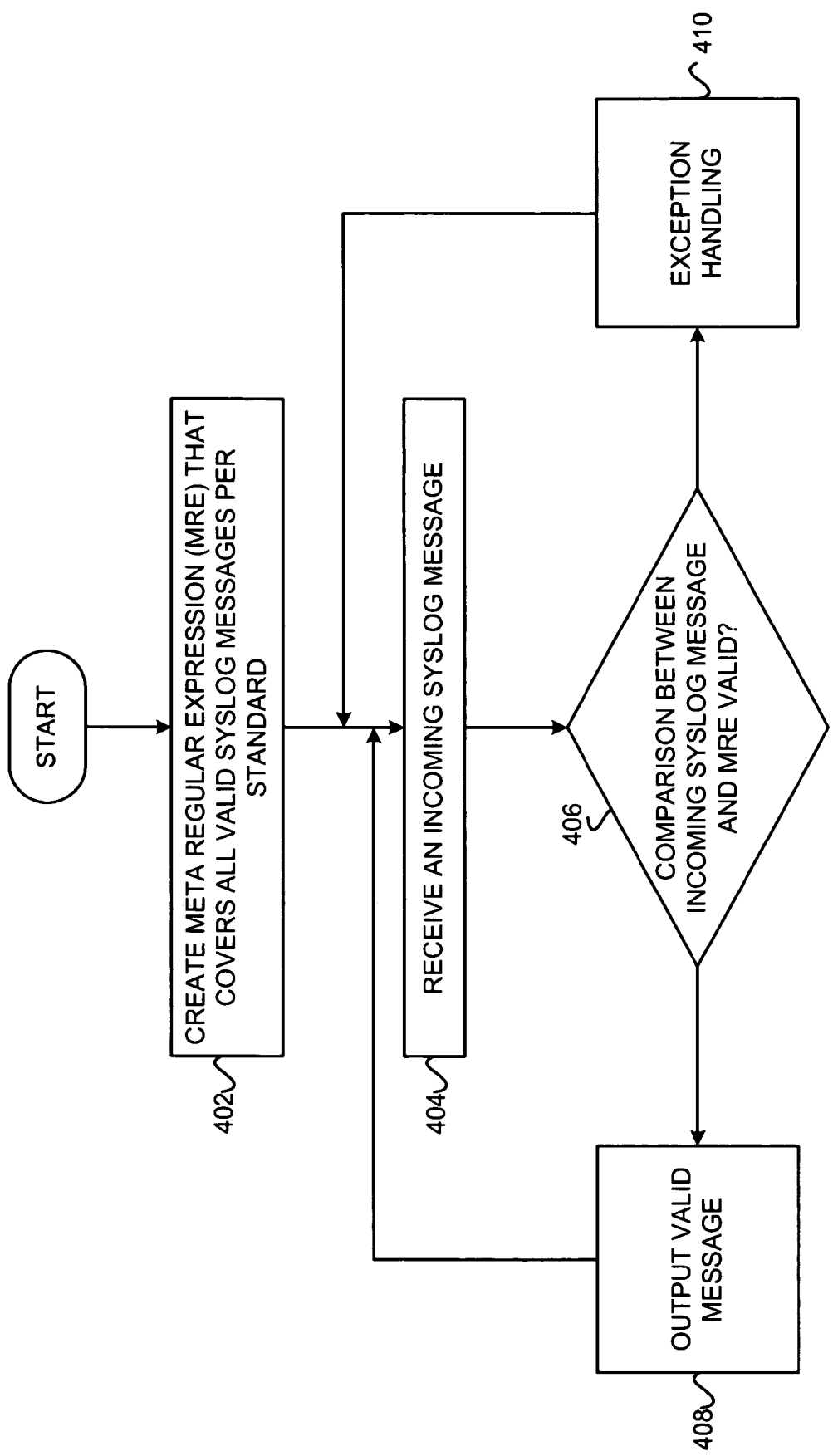
FIG. 4 shows, in an embodiment, a simplified flowchart illustrating how meta regular expression may be employed to validate an incoming syslog message.

FIG. 4 shows, in an embodiment, a simplified flowchart illustrating how a meta regular expression may be employed to validate an incoming syslog message. At step 402, a meta regular expression is generated that covers all possible valid syslog messages per standard regular expression library. As discussed above, once all possible formats for valid syslog messages are identified, a programmer can code for all valid regular expressions and can generate all the possible message component patterns to generate a meta regular expression.

At step 404, the CPU receives an incoming syslog message from the syslog queue. At step 406, the syslog server compares the incoming syslog message against the meta regular expression. If there is a match, the syslog server processes the incoming syslog message and notifies the sender (step 408) that the syslog message has been received successfully. The system then returns to step 404 to retrieve the next incoming syslog message from the syslog queue.

However, if the comparison between the incoming syslog message and the meta regular expression does not produce a match, the syslog server then proceeds to step 410 and exception handling is performed. For example, exception handling may involve discarding the syslog message and logging the details of the invalid syslog message receipt. Once exception handling has been performed, the CPU is ready to receive the next incoming syslog message (step 404).

As can be appreciated from the foregoing, embodiments of the invention provide for a more effective and efficient method of validating syslog messages. By using a meta regular expression, the syslog server is able to validate incoming syslog messages faster. In the prior art, the process of validating an incoming syslog message may involve long and complex codes. However, with the user of a meta regular expression and a pattern matching algorithm, only a minimum number of comparison (i.e., one comparison) may be needed to validate an incoming syslog message.

Since long and complex codes associated with parsing algorithm are eliminated, updates to a meta regular expression are faster and more manageable since changes may only need to occur to a meta regular expression instead of multiple lines of codes. Further, since the system is able to validate the incoming syslog message more efficiently, the system may need less memory space to queue the syslog messages.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for validating a syslog message having a plurality of message components, comprising:
providing a meta regular expression, said meta regular expression being formed from a set of regular expressions with each of said regular expressions corresponding to one of said plurality of message components, said meta-regular expression representing a plurality of message component patterns, each of said message component patterns representing a different relative positioning of individual regular expressions of said set of regular expressions;
comparing a relative positioning of the plurality of message components in said syslog message with said meta regular expression, said syslog message being deemed valid if the relative positioning of the plurality of message components of said syslog message matches one of said plurality of message component patterns represented by said meta regular expression.

2. The method of claim 1 wherein said regular expressions are formed based on syslog message standards defined in Request for Comments (RFC) 3164.

3. The method of claim 1 wherein said syslog message is received at a syslog message server of a computer network.

4. The method of claim 3 wherein said syslog message is sent from a device other than said syslog message server, said device being coupled with said computer network.

5. The method of claim 1 wherein said comparing includes performing pattern matching.

6. The method of claim 1 wherein said meta regular expression is formed using a cross-platform language.

7. The method of claim 6 wherein said cross-platform language is Perl.

8. The method of claim 6 wherein said cross-platform language is Java.

9. An article of manufacture comprising a program storage medium having computer readable code embodied therein, said computer readable code being configured to validate a syslog message having a plurality of message components comprising:
computer readable code for retrieving a meta regular expression from memory, said meta regular expression being formed from a set of regular expressions with each of said regular expressions corresponding to one of said plurality of message components, said meta-regular expression representing a plurality of message component patterns, each of said message component patterns representing a different relative positioning of individual regular expressions of said set of regular expressions;
computer readable code for comparing a relative positioning of the plurality of message components in said syslog message with said meta regular expression, said syslog message being deemed valid if the relative positioning of the plurality of message components of said syslog message matches one of said plurality of message component patterns represented by said meta regular expression.

10. The article of manufacture of claim 9 wherein said regular expressions are formed based on syslog message standards defined in Request for Comments (RFC) 3164.

11. The article of manufacture of claim 9 wherein said syslog message is received at a syslog message server of a computer network.

12. The article of manufacture of claim 11 wherein said syslog message is sent from a device other than said syslog message server, said device being coupled with said computer network.

13. The article of manufacture of claim 9 wherein said comparing includes performing pattern matching.

14. The article of manufacture of claim 9 wherein said meta regular expression is formed using a cross-platform language.

15. The article of manufacture of claim 14 wherein said cross-platform language is Perl.

16. The article of manufacture of claim 14 wherein said cross-platform language is Java.

17. An arrangement for a first syslog message having a plurality of message components, comprising:
- a plurality of network components coupled to a network, wherein each of the plurality of network components is a hardware component;
- a syslog server configured to receive syslog messages from said plurality of network components, including said first syslog message, said syslog server including:
  - means for retrieving a meta regular expression, said meta regular expression being formed from a set of regular expressions with each of said regular expressions corresponding to one of said plurality of message components, said meta-regular expression representing a plurality of message component patterns, each of said message component patterns representing a different relative positioning of individual regular expressions of said set of regular expressions; and
  - means for comparing a relative positioning of the plurality of message components in said syslog message with said meta regular expression, said syslog message being deemed valid if the relative positioning of the plurality of message components of said syslog message matches one of said plurality of message component patterns represented by said meta regular expression.

18. The arrangement of claim 17 wherein said regular expressions are formed based on syslog message standards defined in Request for Comments (RFC) 3164.

* * * * *